(12) United States Patent
Pearson (10) Patent No.: US 9,843,114 B2
(45) Date of Patent: Dec. 12, 2017

(54) ADAPTER SYSTEM FOR PLUG-ON NEUTRAL LOAD CENTER

(71) Applicant: SCHNEIDER ELECTRIC USA, INC., Palatine, IL (US)

(72) Inventor: Dave Pearson, Palo, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 191 days.

(21) Appl. No.: 14/767,343

(22) PCT Filed: Feb. 28, 2013

(86) PCT No.: PCT/US2013/028226
§ 371 (c)(1),
(2) Date: Aug. 12, 2015

(87) PCT Pub. No.: WO2014/133519
PCT Pub. Date: Sep. 4, 2014

(65) Prior Publication Data
US 2015/0380842 A1    Dec. 31, 2015

(51) Int. Cl.
*H01R 25/00* (2006.01)
*H01R 9/24* (2006.01)
(Continued)

(52) U.S. Cl.
CPC ............ *H01R 9/2491* (2013.01); *H01R 25/00* (2013.01); *H02B 1/056* (2013.01); *H02B 1/48* (2013.01); *H01R 31/08* (2013.01)

(58) Field of Classification Search
None
See application file for complete search history.

(56) References Cited

U.S. PATENT DOCUMENTS 3,218,519 A * 11/1965 Casey .................... H02B 1/056
                                                          361/634
4,079,439 A *  3/1978 Coles ....................... H02B 1/42
                                                          174/70 B (Continued)

OTHER PUBLICATIONS

International Search Report dated May 3, 2013 in International Application Serial No. PCT/US13/028226.

*Primary Examiner* — Dimary Lopez Cruz
*Assistant Examiner* — Zhengfu Feng
(74) *Attorney, Agent, or Firm* — Locke Lord LLP (57) ABSTRACT

An adapter bracket, which screws onto an existing neutral bar in a load center, having legs inserted through the holes in the neutral bar or screwed into the top of the neutral bar. The adapter bracket is configured to accept downward-facing or sideways-facing plug-on neutral mounting clips of a plug-on neutral circuit breaker. The bracket has a support portion extending along a Z-axis perpendicular to a rear wall of the load center. The downward-facing clips can be plugged onto the support portion. Sideways-facing clips are received onto tabs that are bent away from the support portion of the bracket and feature chamfered ends and a relatively small aspect ratio relative to the length of the mounting clip. The other holes in the existing neutral bar remain unobstructed so that a conventional neutral conductor can be inserted through the free holes while the adapter bracket accommodates plug-on neutral mounting clips.

15 Claims, 12 Drawing Sheets

(51) Int. Cl.
  *H02B 1/056* (2006.01)
  *H02B 1/48* (2006.01)
  *H01R 31/08* (2006.01)

(56) References Cited

U.S. PATENT DOCUMENTS

| | | |
|---|---|---|
| 4,999,876 A | 3/1991 | Nass |
| 5,973,914 A * | 10/1999 | Rose .................. H02B 1/056 200/50.4 |
| 6,266,232 B1 * | 7/2001 | Rose .................. H02B 1/056 248/222.11 |
| 7,094,071 B2 | 8/2006 | Hackemack et al. |
| 7,508,653 B2 * | 3/2009 | Parlee .................. H02B 1/205 361/636 |
| 7,772,723 B1 * | 8/2010 | Flegel .................. H02B 1/056 307/125 |
| 7,957,122 B2 | 6/2011 | Sharp |
| 2011/0002089 A1 * | 1/2011 | Sharp .................. H02B 1/056 361/673 |
| 2011/0294321 A1 | 12/2011 | Sagdic et al. |

* cited by examiner

ADAPTER SYSTEM FOR PLUG-ON NEUTRAL LOAD CENTER

FIELD OF THE INVENTION

The present disclosure relates to electrical distribution equipment and methods of configuring the same, and in particular, to a load center featuring a neutral adapter bracket that accepts plug-on neutral mounting clips of plug-on neutral circuit breakers.

BACKGROUND

A load center interior is housed within a metal enclosure or panel and holds multiple circuit breakers that are connected to various branch circuits in an electrical distribution system. Conventional load centers have a neutral bar with neutral connection pigtail receiving holes that accept panel neutral conductors from electronic circuit breakers to secure the pigtail conductors from the circuit breakers to the load center by a wire binding screw. Plug-on neutral circuit breakers feature a mounting clip or jaw that plugs onto a neutral rail without the use of any fasteners. What is needed is an adapter bracket for retrofitting existing load centers that already have a neutral bar to upgrade the load center to accept plug-on neutral circuit breakers. Aspects of the present disclosure address this and other needs.

BRIEF SUMMARY

According to an implementation of the present disclosure, an adapter bracket that screws onto an existing neutral bar in a load center features legs that are inserted through the holes in the neutral bar or screwed into the top of the neutral bar. These holes are conventionally used to receive a neutral pigtail conductor of a conventional circuit breaker that does not feature a neutral clip or jaw of a plug-on type. The panel neutral is often referred to as the pigtail connection as the wire is long to allow installation in various locations. The extra length is helically wound and is referred to as the pigtail. This implementation exploits the presence of the existing holes in the neutral bar to use as fastening points for the adapter bracket without obstructing or obscuring the other holes in the neutral bar. These unobstructed holes can still be used to receive neutral pigtail conductors of thermal magnetic only conventional-style circuit breakers that are installed in the load center.

The adapter bracket includes a support portion that extends along a Z-axis that is perpendicular to a plane corresponding to a major flat surface of the load center. This major flat surface can be a rear wall of the load center. The support portion extends a distance along the Z-axis to maintain a separation between the mounting clips of the circuit breaker and the metal conductors distributing line and neutral currents through the load center. The adapter bracket has neutral connection "sites," which broadly can be a location or fastening point for receiving a plug-on neutral mounting clip of a plug-on neutral circuit breaker. The mounting clips can resemble jaws, and the open part of the jaw can face downward along the Z-axis direction toward the rear wall of the load center when the plug-on neutral circuit breaker is plugged onto the adapter bracket, or the open part of the jaw can extend along the plane toward the center of the load center.

To accommodate downward-facing plug-on neutral mounting clips, the support portion of the adapter bracket extends vertically along the Z-axis away from the rear wall, and the neutral connection sites are formed along the exposed end of the support portion. The end of the support portion can have a chamfered edge to facilitate removal and installation of mounting clips thereon. Instead of legs passing through the existing holes of the neutral bar, the legs can include slots that fit over the neutral bar, and the adapter bracket is screwed onto the neutral bar by screws passing through the slots into the neutral bar.

To accommodate sideways-facing plug-on neutral mounting clips, the support portion of the adapter bracket can terminate with tabs that extend parallel to the plane. Each of these tabs corresponds to a neutral connection site that receives a plug-on neutral mounting clip. The thickness of the tabs can be dimensioned such that an aspect ratio defined by the ratio between the thickness of the tabs and an overall length of the mounting clip is relatively small to allow the mounting clip to be removed from or installed onto the clip without significant deformation or bending, which would otherwise tend to permanently weaken or deform the mounting clip.

Not every aspect of the inventive concepts disclosed herein has been included in this summary. This summary represents one of many ways of implementing an exemplary aspect of the present disclosure. This and other implementations are described in more detail in the description that follows.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While aspects of the present disclosure are susceptible to various modifications and alternative forms, specific embodiments or implementations have been shown by way of example in the drawings and will be described in detail herein. It should be understood, however, that this disclosure is not intended to be limited to the particular forms disclosed. Rather, this disclosure is to cover all modifications, equivalents, and alternatives falling within the spirit and scope of the invention as defined by the appended claims.

DETAILED DESCRIPTION

Figure 1:
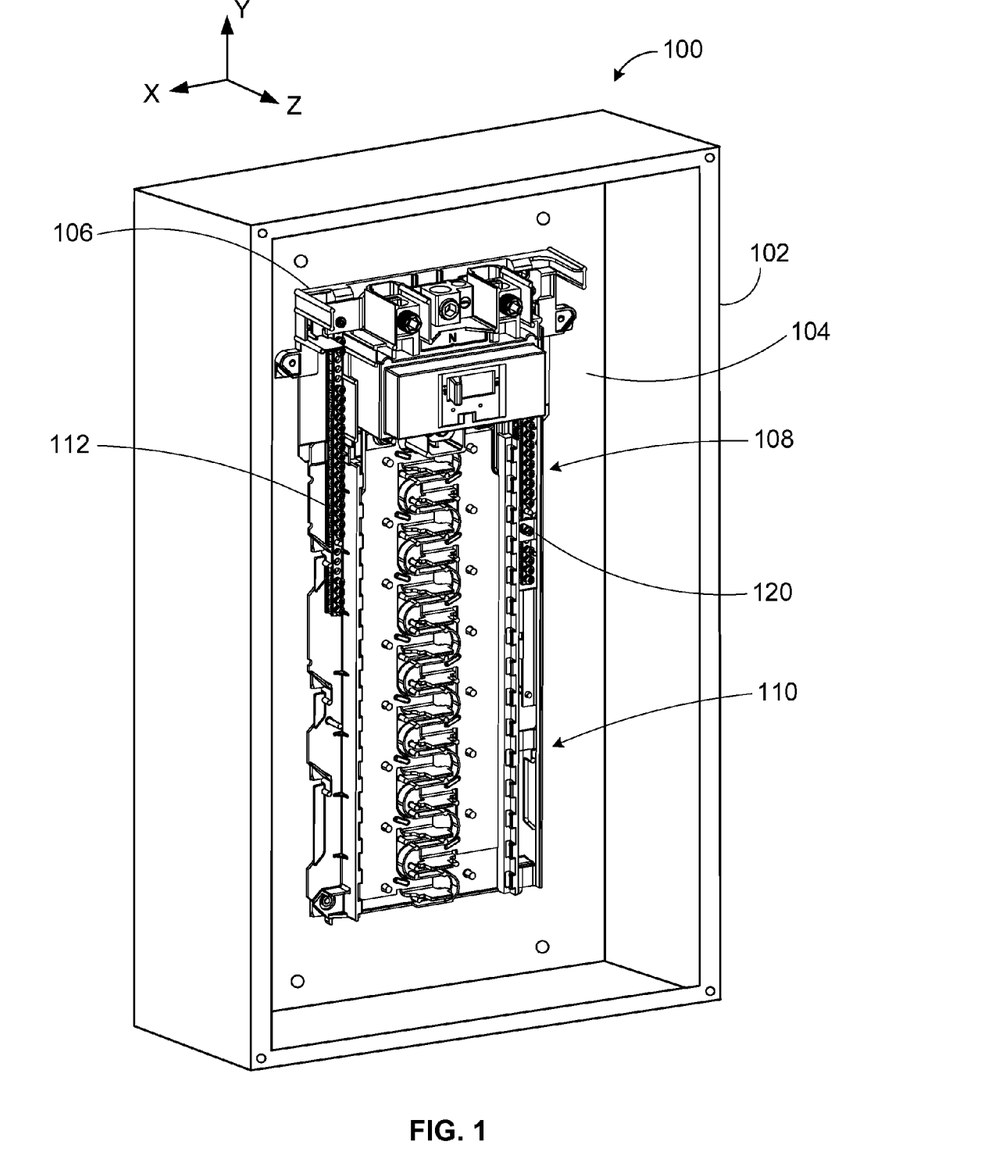
FIG. 1 is a perspective view of an enclosure housing a circuit breaker mounting interior load center with the door or access panel removed.

Referring to FIG. 1, a perspective view of an enclosure 102 of an electrical distribution apparatus 100, such as a panelboard or load center interior 106, is shown with the door or cover removed so that the lug and mounting connections of the load center interior 106 to plug-on neutral type circuit breakers can be seen. The load center 106 includes an upper section 108 (relative to the Y-axis shown in the X-Y-Z Cartesian coordinate legend in FIG. 1) and a lower section 110. In general, like reference numbers refer to like structures throughout the figures and various embodiments, and a reference number starts with the number of the figure where the reference number is first introduced. The enclosure 102 is typically metal and has a rear wall 104 opposite the panel or door (not shown) to which the main section 108 and the plug-on section 110 is mounted. The upper section 108 includes a pair of neutral bars, designated by reference number 112 as they are identical, on each side of the load center 106. The terms neutral bar and neutral busbar are synonymous herein.

Figure 6:
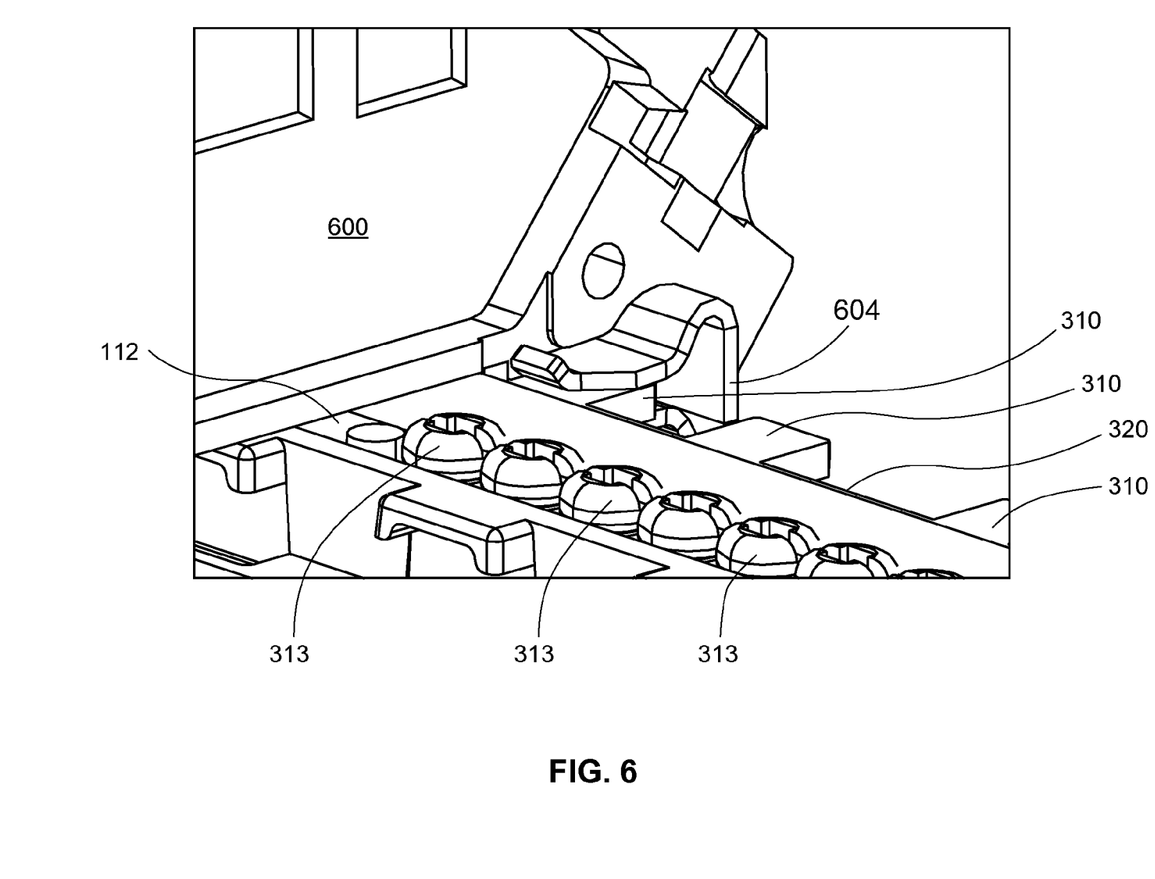
FIG. 6 is a perspective view of half of a circuit breaker and its corresponding PON mounting clip plugged onto one of the neutral connection sites shown in FIG. 3.

Aspects of this disclosure focus on a plug-on neutral adapter bracket, generally designated by reference number 120, variations of which are described in more detail below. The adapter bracket 120 is made of an electrically conducting material such as aluminum or copper. Circuit breakers, of which there can be, for example, 24 or 30 or 60 per enclosure 102, such as a circuit breaker 600 (FIG. 6), featuring a plug-on neutral mounting connector or clip 604 (FIG. 6) can be mounted to the adapter bracket 120 by plugging the connector 604 onto the adapter bracket 120 without requiring any other fasteners to secure the neutral connection of the circuit breaker 600 to the load center interior 106. The neutral connector 604 of the circuit breaker 600 connects the circuit breaker 600 to neutral current distributed by the electrical distribution apparatus 100. The circuit breaker 600 also has a conventional line or phase connector or jaw (such as the line jaw 830 shown in FIG. 8 disembodied from a circuit breaker), which connects to a line or phase current also distributed by the electrical distribution apparatus 100, which is connected between a source (e.g., one or more phases) of electrical current and one or more loads in one or more electrical circuits protected by the circuit breakers 600 installed in the electrical distribution apparatus 100. An example of a suitable circuit breaker 600 is any electronic neutral plug-on type circuit breaker from the SQUARE D® brand QO® or HOM® line of circuit breakers available from Schneider Electric.

Figure 2:
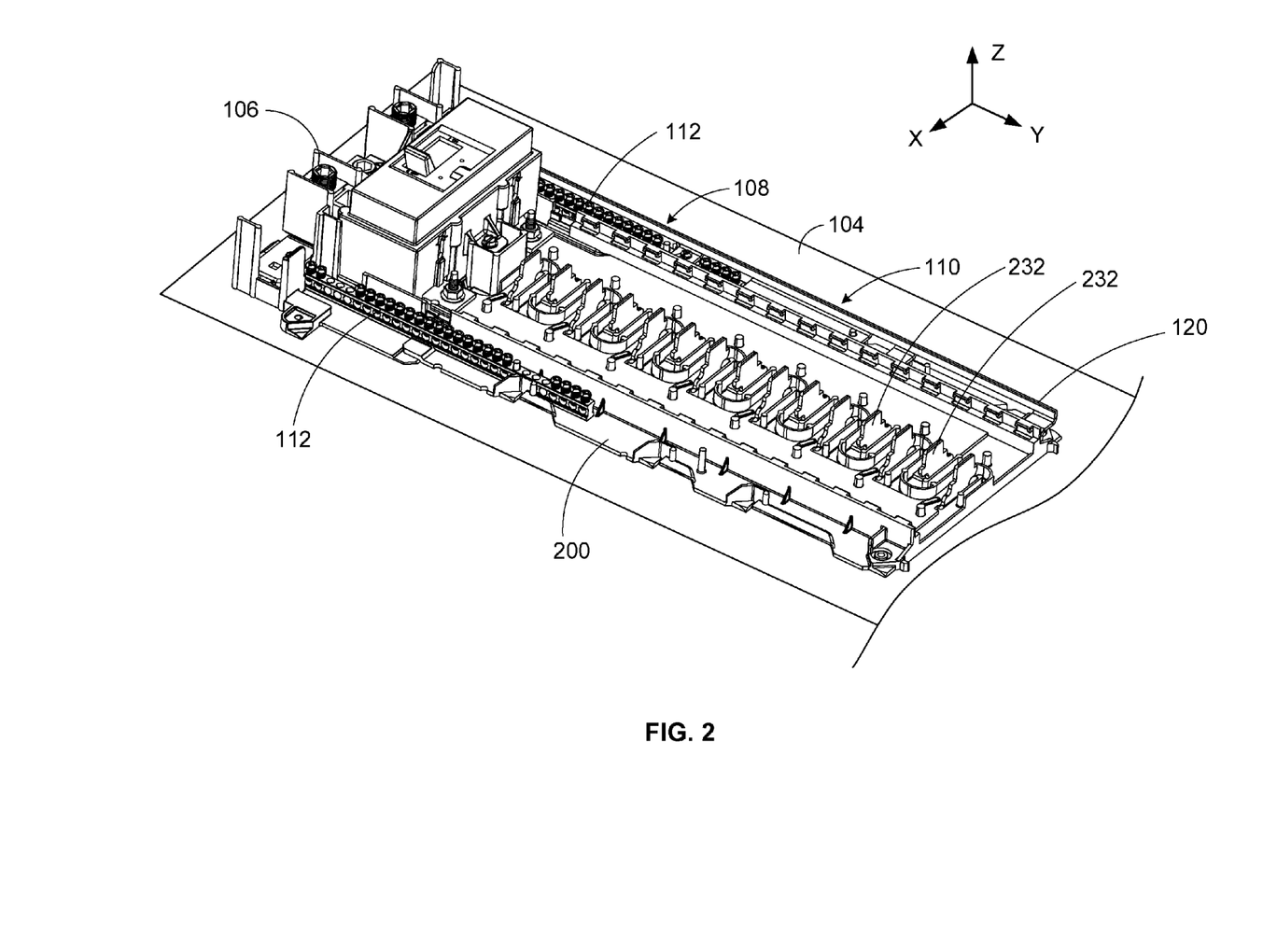
FIG. 2 is a top perspective view of the load center interior showing a plug-on neutral bracket adapter according to an aspect of the present disclosure.

The load center 106 includes a fixed dielectric base 200 having a major surface that defines an X-Y (Cartesian coordinates) plane as shown in FIG. 2. The Z-axis is orthogonal to the X-Y plane. The base 200 (FIG. 2) is fixed relative to the rear wall 104 of the enclosure 102. The base 200 together with an optional dielectric shield form a dielectric (insulating) barrier between the neutral bar 112 and the adapter bracket 120, on the one hand, and phase conductors (not shown as they are hidden beneath the base 200) carrying line or phase current to the load center 106, on the other hand. The phase conductors are connected to stabs 232, shown in FIG. 2, to which a corresponding line jaw (not shown) of the circuit breaker 600 is connected.

Figure 12:
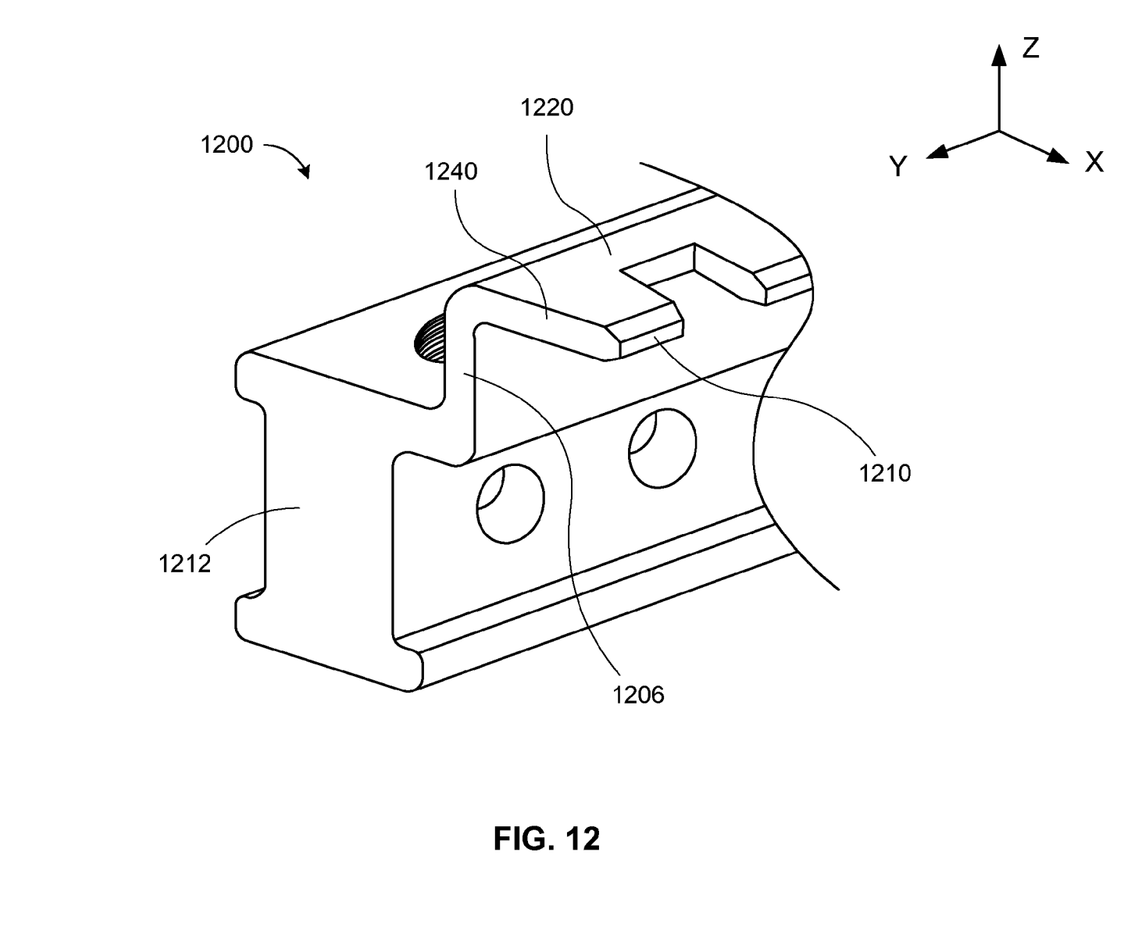
FIG. 12 is an illustration of a neutral adapter integrated with a neutral bar according to another aspect of the present disclosure.

The adapter bracket 120 generally can be a unitary piece (e.g., a single piece of metal made by a fabrication or casting process), and thus a separate piece from the neutral bar 112. The adapter bracket can also be integrated into the neutral bar, such as shown in FIG. 12 and described below. The bracket 120 is of an adapter type, which here means that it can be retrofitted into an existing load center, such as one that only has a conventional neutral bar 112 and thus lacks the capability to accept plug-on neutral ("PON") circuit breakers. By installing the adapter bracket 120 according to this disclosure, a conventional load center can be readily and easily retrofitted to accept PON circuit breakers. Of course, a load center can also be designed to accept an adapter bracket 120 as disclosed herein, and thereby make it "backwards" compatible with legacy circuit breakers where the neutral connection is made by attaching a conductor. For buildings wishing to bridge the technology gap, where the majority of circuit breakers now feature plug-on neutral connectors, can install an adapter bracket 120, which provides the best of both worlds.

The length of the adapter bracket 120 (measured along the Y-axis) can be varied. For example, the length of the neutral bar 112 can extend only along the upper section 108, and the length of the adapter bracket 120 can coincide with the length of the neutral bar 112, or be longer than the length of the neutral bar as shown in FIG. 2. Thus, in FIG. 2, in the lower section 110, a "plug-on only" section is created that accepts PON-type circuit breakers and no pigtail connections. In this example, the length of the neutral bar 112 is half that of the adapter bracket 120. The length of the adapter bracket can be dimensioned to accept twelve or fifteen plug-on neutral circuit breakers plugged onto the adapter bracket (thus, in configurations where an adapter bracket 120 is installed on both sides of the load center 106, the load center 106 can accommodate up to 24 or 30 PON circuit breakers). In another example, the length of the adapter bracket 120 can be shorter, such as by half, compared to the length of the neutral bar 112, creating a "pigtail only" section that accepts pigtail connections only and no PON connections.

The adapter bracket 120 is configured to attach to the neutral bar 112, such as one that already exists in the enclosure 102. To do so, a variety of mounting systems are contemplated. Starting with FIG. 3, an adapter bracket 320 based on the adapter bracket 120 features "sideways" neutral connection sites and a leg-mounting system. By "sideways," it is meant that the PON mounting clip 604 (shown in FIG. 4) of a PON circuit breaker 600 (see FIG. 6) is clipped or attached to the adapter bracket 320 along the X-axis direction (e.g., toward the center of the enclosure 102 along its width dimension). A "site" can be a connection point or area of the adapter bracket, which receives or accepts a neutral mounting clip or connector (sometimes called a jaw) of a plug-on neutral circuit breaker. For example, a neutral connection site is a structural feature that retains another structure (e.g., a PON mounting clip) in a fixed position or in a secure engagement relative to one another. The adapter bracket 320 includes two legs 302, 304 (both shown in FIG. 3) that are positioned parallel to the plane defined by the X-Y axis, which corresponds to a major flat surface, such as the rear wall 104, of the enclosure 102. The adapter bracket 120 when attached to the neutral bar 112 electrically conducts neutral current from circuit breakers, such as the circuit breaker 600, installed in the electrical distribution apparatus 100 to the neutral bar 112 through the legs 302, 304. The adapter bracket 120 and the neutral bar 112 can be made from the same electrically conductive material or from different electrically conductive materials.

Note that for ease of illustration and discussion, parts of the circuit breaker 600 have been removed, such one half of its case (FIG. 6), or its other half (FIG. 7), or its case entirely (FIGS. 4, 5B) revealing just the PON mounting clip 604. If the entire circuit breaker 600 were shown, it would conceal aspects of the present disclosure and detract from a visual understanding of the same.

Figure 3:
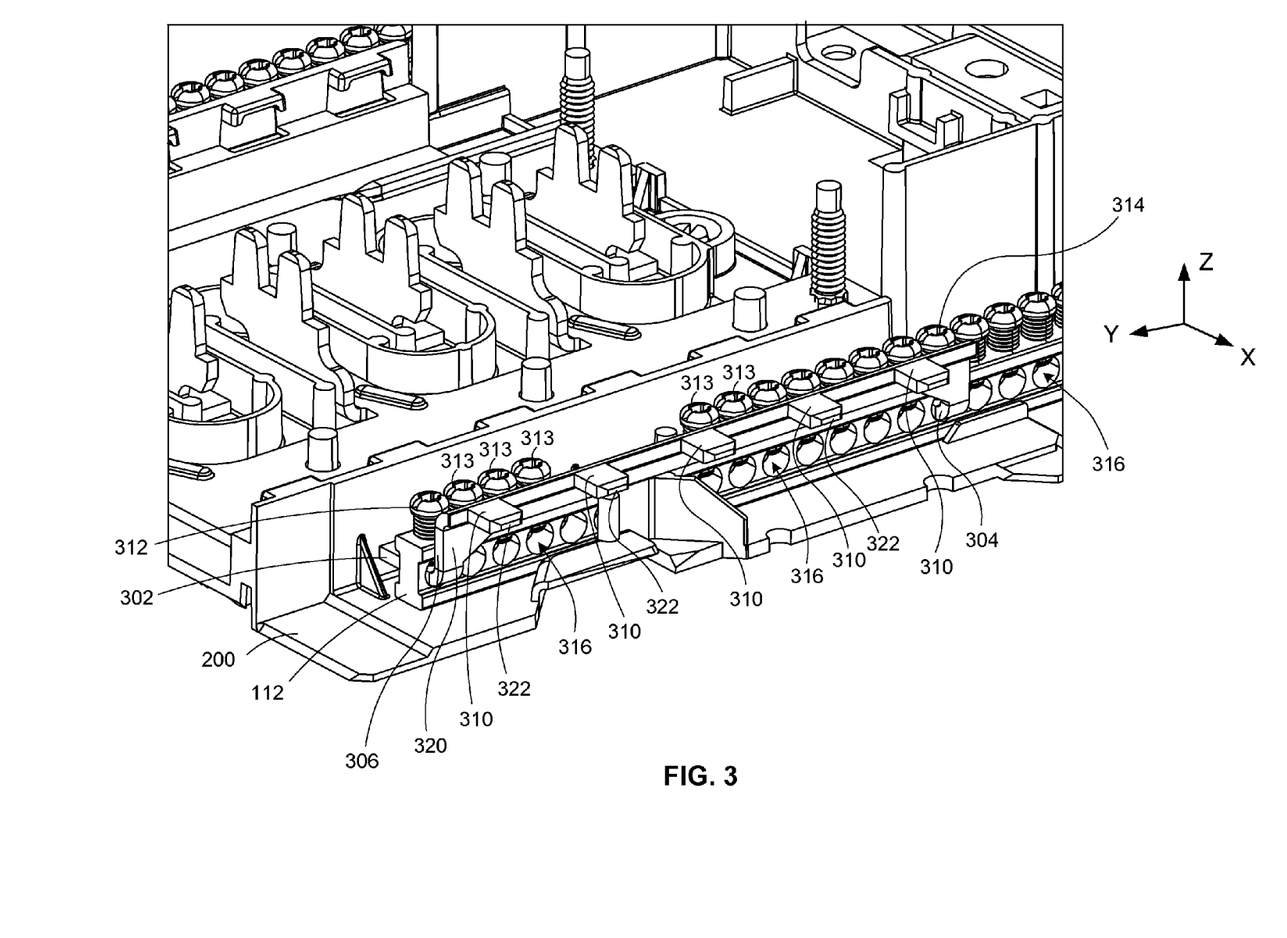
FIG. 3 is a perspective view of part of a load center interior having a plug-on neutral adapter bracket with protruding tabs that accept a sideways mounting plug-on neutral clip of a plug-on neutral circuit breaker according to an aspect of the present disclosure.

The adapter bracket 302 includes a support portion 306 extending along a Z-axis that is perpendicular to the plane defined by a major flat surface of the rear wall 104 (the term "major flat surface" is used here because the rear wall can have protrusions, ridges, holes, etc. that does not make it entirely flat). This support portion 306 need not be exactly 90 degrees from a major flat surface of the rear wall 104. The height (along the Z-axis) of the support portion 306 is dimensioned to provide a desired air-gap separation between the grounded rear wall 104 of the enclosure 102 and the bottommost part of the mounting clips 604 of all installed PON circuit breakers 600 onto the load center 106 within the enclosure 102. Thus, the support portion 306 can be angled slightly away from the Z-axis and still provide this air-gap separation. An orthogonal relationship requires the least amount of metal material to be used, though angling the support portion 306 slightly away from the Z-axis is entirely contemplated and will not fall outside the scope of this disclosure.

The adapter bracket 302 includes multiple neutral connection sites 310 each located a distance above the neutral bar 112 along the Z-axis when the adapter bracket is secured to the neutral bar 112 by corresponding fasteners 312, 314 (shown as wire binding screws 312, 314 in FIG. 3). Each of the neutral connection sites 310 is configured to receive a corresponding plug-on neutral mounting clip 604 of a plug-on neutral circuit breaker 600.

Figure 4:
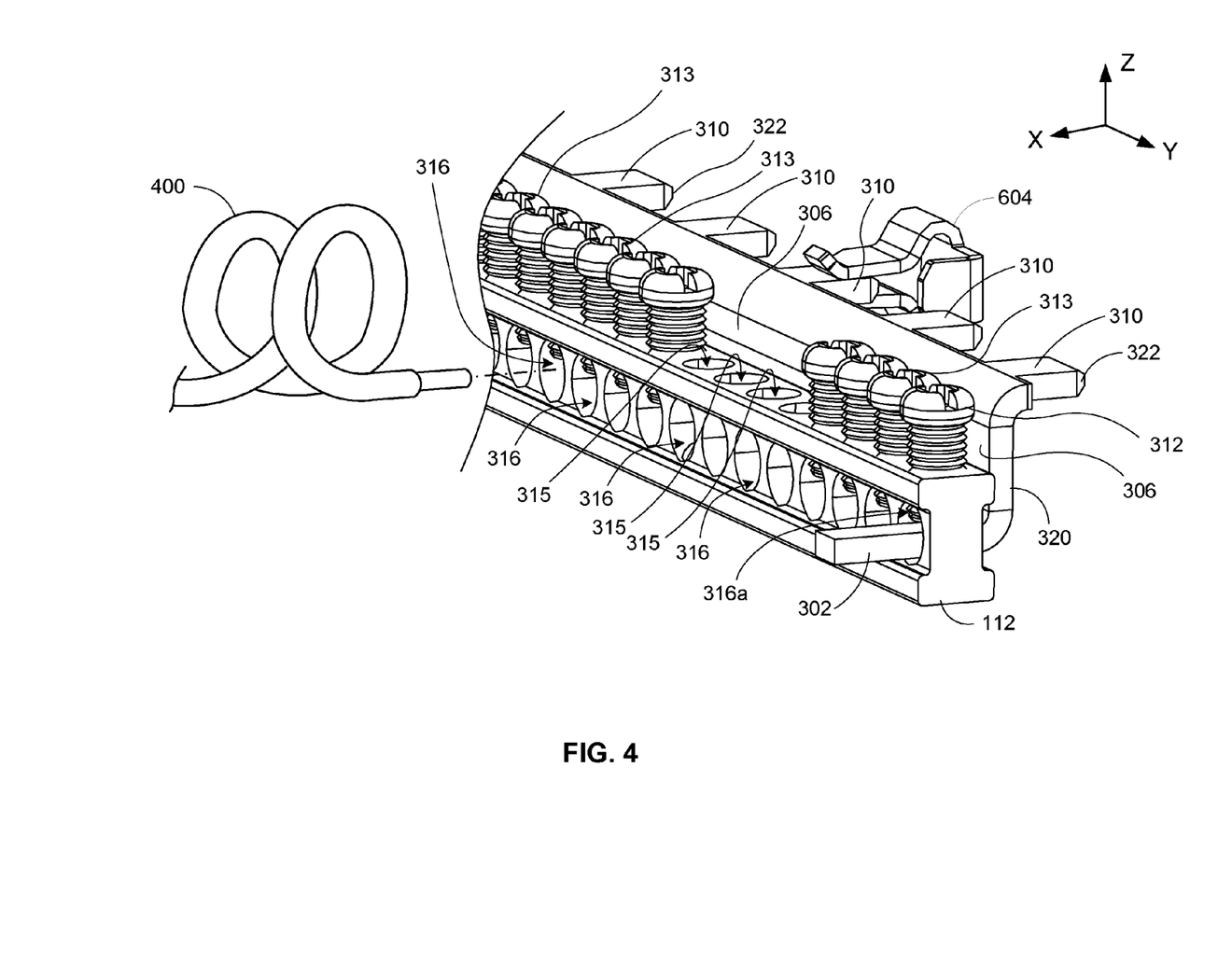
FIG. 4 is a perspective view of the adapter bracket shown in FIG. 3 attached to a neutral bar by a leg that is received through one of the pigtail receiving holes of the neutral bar.
Figure 7:
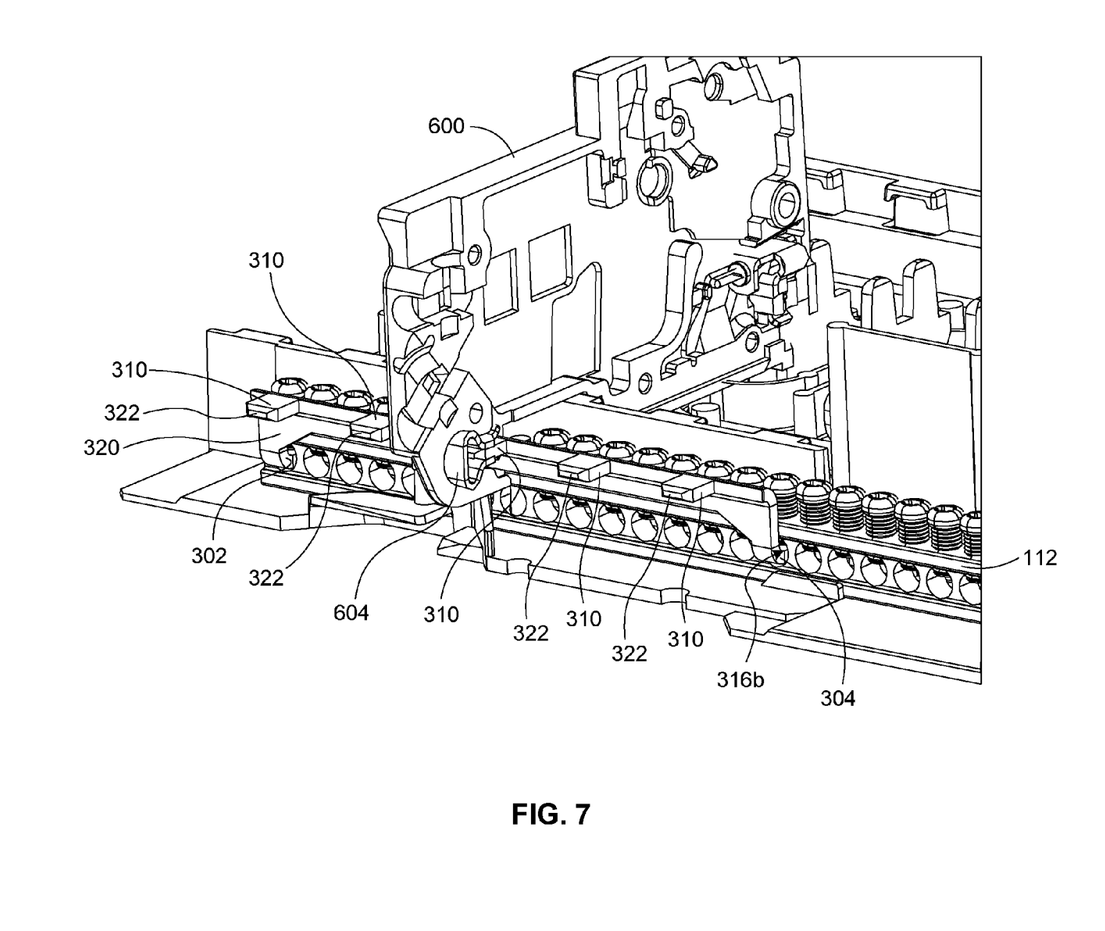
FIG. 7 is a perspective view of another half of the circuit breaker and its corresponding PON mounting clip plugged onto one of the neutral connection sites shown in FIG. 6.

The neutral bar 112 has pigtail receiving holes 316 (best seen in FIGS. 3 and 4) for receiving therein a neutral pigtail conductor of a circuit breaker. Only some of the pigtail receiving holes 316 are indicated, though as can be seen in the illustrations, the neutral bar 112 includes many pigtail receiving holes 316 regularly spaced along its length. One of the legs 302 of the adapter bracket 320 is inserted through a leg-receiving hole 316a (FIG. 4), and the other leg 304 is inserted through a leg-receiving hole 316b (see FIG. 7) such that the other pigtail receiving holes 316 remain unobstructed (not blocked) when the adapter bracket 320 is attached to the neutral bar 112. As can be seen in FIGS. 3 and 7, for example, the other pigtail receiving holes 316 (not labeled 316a or 316b) remain unobstructed from the side farthest away from the center of the load center 106. In these unobstructed pigtail receiving holes 316, a conventional neutral pigtail conductor 400 (FIG. 4) of a circuit breaker (not shown) can be inserted, and then a wire binding screw 313 inserted through a fastener-receiving hole 315 (FIG. 4) is tightened to secure the neutral pigtail conductor 400 into the neutral bar 112. The pigtail receiving holes 316 generally run through the neutral bar 112 in a direction that is parallel with the X-Y plane. In FIG. 4, some of the wire binding screws 313 have been removed to show the corresponding fastener-receiving holes 315. These holes 315 run along the Z-axis direction, and are differentiated from the pigtail receiving holes 316 that run along the X-axis direction and coincide with the holes 315 inside the neutral bar 112.

In the example shown in FIG. 3, the neutral connection sites 310 take the form of protruding tabs that extend parallel to the X-Y plane a distance above the base 200 to maintain an air gap separation between a mounting clip 604 (which, when energized, carries neutral current) and the grounded rear wall 104. Each of the tabs 310 can have a chamfered end 322, such as shown in FIGS. 3, 4, and 7, or any other suitable profiled end to accept a mounting clip 604. A mounting clip 604 of a PON circuit breaker 600 is clipped onto the tab 310, to create a mechanical and neutral electrical connection between the circuit breaker and the load center 106.

Figure 5A:
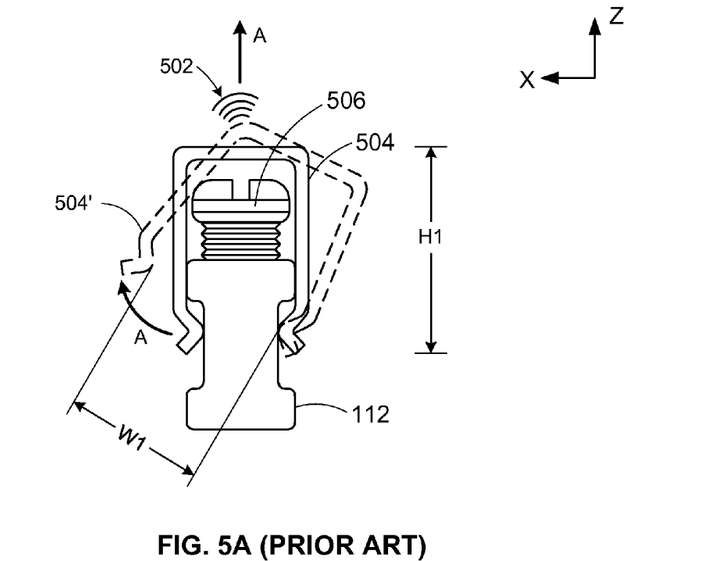
FIG. 5A is an end view of a conventional neutral bar and a conventional mounting clip plugged directly onto the neutral bar, which mounting clip can become overstressed and mechanically deformed when removing the circuit breaker by rational action around the neutral bar.
Figure 5B:
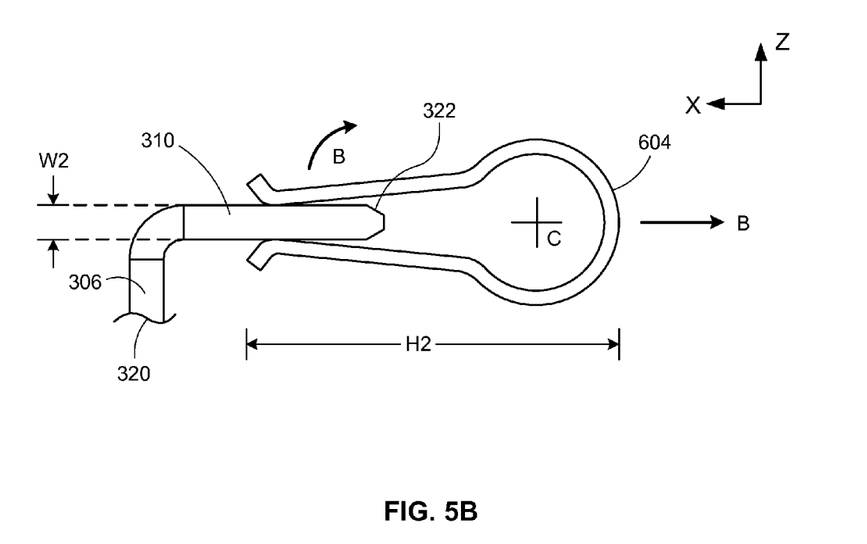
FIG. 5B is a side view of the adapter bracket shown in FIG. 3 onto which a PON mounting clip is plugged and having a relatively small aspect ratio relative to the aspect ratio of the conventional neutral bar and mounting clip assembly shown in FIG. 5A.

Turning now to FIGS. 5A and 5B, an aspect of the adapter bracket 302 will be described. A conventional mounting system is shown in FIG. 5A, in which a neutral mounting clip 504 is installed directly over a neutral bar 112, which, as shown in FIG. 5A, resembles an I-beam. The mounting clip 504 must be designed with sufficient clearance to clear a wire binding screw 506 so that the installer does not have to remove the screw 506 to install the mounting clip 504. In addition, the circuit breaker together with the mounting clip 504 is rotated onto the neutral bar 112 along an arcuate path. This rotational moment, particularly when removing the mounting clip 504 from the neutral bar 112 in rotational and upward (Z-axis) directions of arrows A, creates a stress at the area designated by the arrow 502, weakening or deforming the mounting clip 504 in this spot as the clip 504 bends to a stressed position 504'. Over time, the mounting clip 504 can lose its gripping efficacy, creating loose or intermittent connections to the neutral bar 112. As a result, the aspect ratio, defined herein as a maximum overall width, W1, of the opening of the mounting clip 504 to the overall length, H1, of the mounting clip 504, is relatively large. The maximum width W1 refers to the maximum width of the mounting clip 504 opening when the mounting clip 504 is rotated off of the neutral bar 112 (in the direction of arrow A). The mounting clip 504 must clear the wire binding screw 506, which increases a width of the opening to W1. For example, one known mounting system results in an aspect ratio (W1/H1) of 0.43.

By contrast, turning now to FIG. 5B, the aspect ratio according to this exemplary implementation of the present disclosure can be made much smaller, thanks to the dimensions and geometries of the neutral connection site 310 of the adapter bracket 320 and the mounting clip 604. Note that the form factor of the mounting clip 604 is by way of example only, and other forms are contemplated, such as the form shown in FIG. 4. The exemplary form shown in FIG. 5B is merely to illustrate an improvement in the aspect ratio. In FIG. 5B, the aspect ratio of this configuration is defined by an overall width, W2, of the tab 310, and an overall length, H2, of the clip 604, such that the aspect ratio is W2/H2. In an example, the aspect ratio does not exceed 1:4. When the mounting clip 604 is rotated and pulled away from the bracket 320 in the direction of arrows B, the geometry of the clip 604, aided by the chamfered end 322 of the tab 310, clears the tab 310 without stressing the clip 604 (though some slight bending of the clip 604 may occur, this will not appreciably increase W2). A revolute joint is formed centered about point C with one degree of freedom that allows the clip 604 to rotate about point C away from the tab 310 while simultaneously being pulled away along the X-axis.

The examples shown in FIGS. 3-7 above relate to an implementation of the adapter bracket 120 where the neutral connection sites 310 are tabs or protrusions that permit a "sideways" (X-axis) direction mounting of a PON mounting clip 605. In the examples shown in the figures that follow, other implementations are illustrated and described where the neutral connection sites 310 extend along the Z-axis direction to permit a "downward" direction mounting (Z-axis) of a PON mounting clip, such as the mounting clip 904 shown in FIG. 9. These examples will be described next with like reference numbers referring to like elements already introduced and described above.

Figure 8:
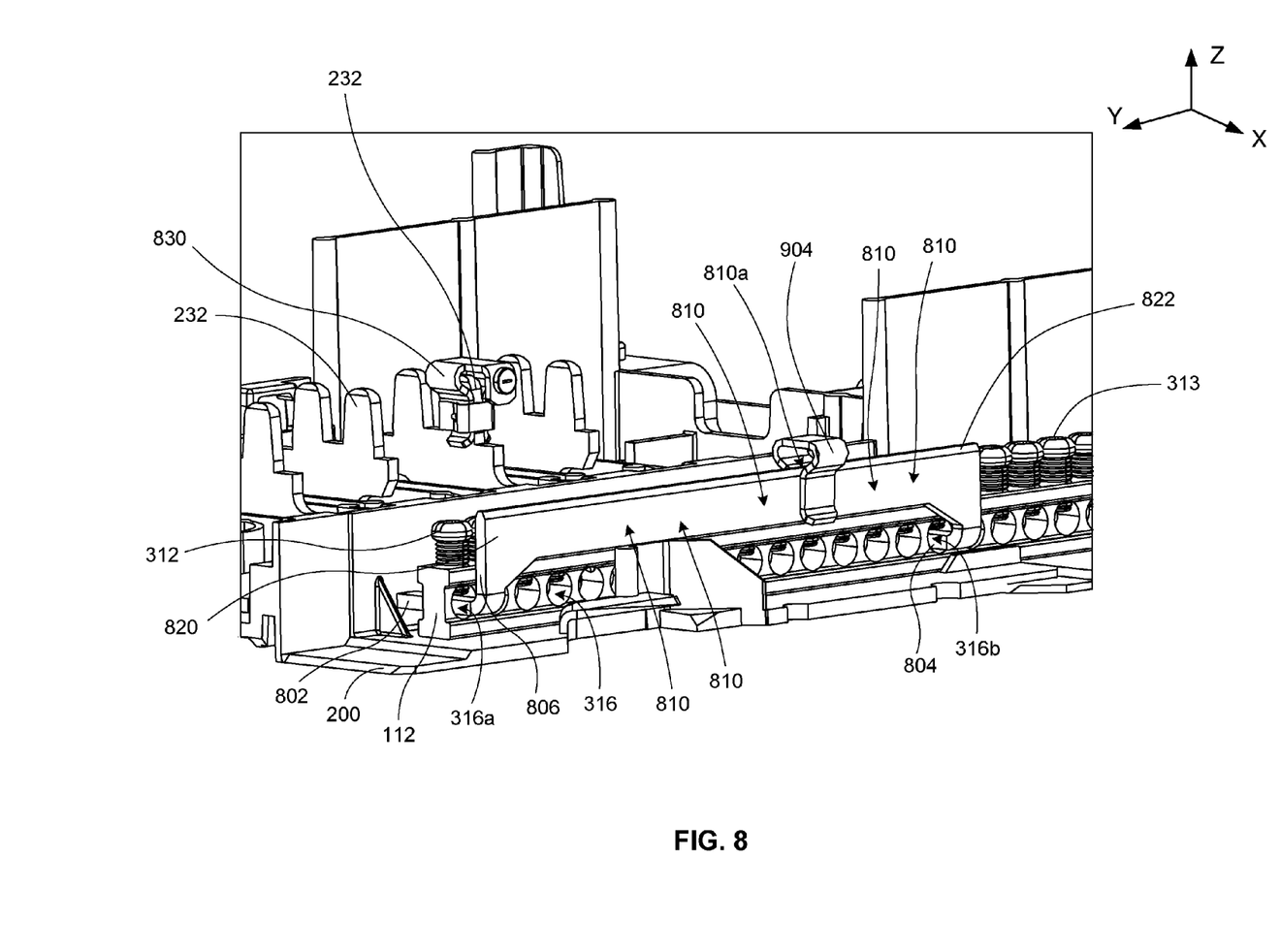
FIG. 8 is a perspective view of part of a load center having a plug-on neutral adapter bracket that accepts a downwards facing PON mounting clip according to another aspect of the present disclosure.
Figure 9:
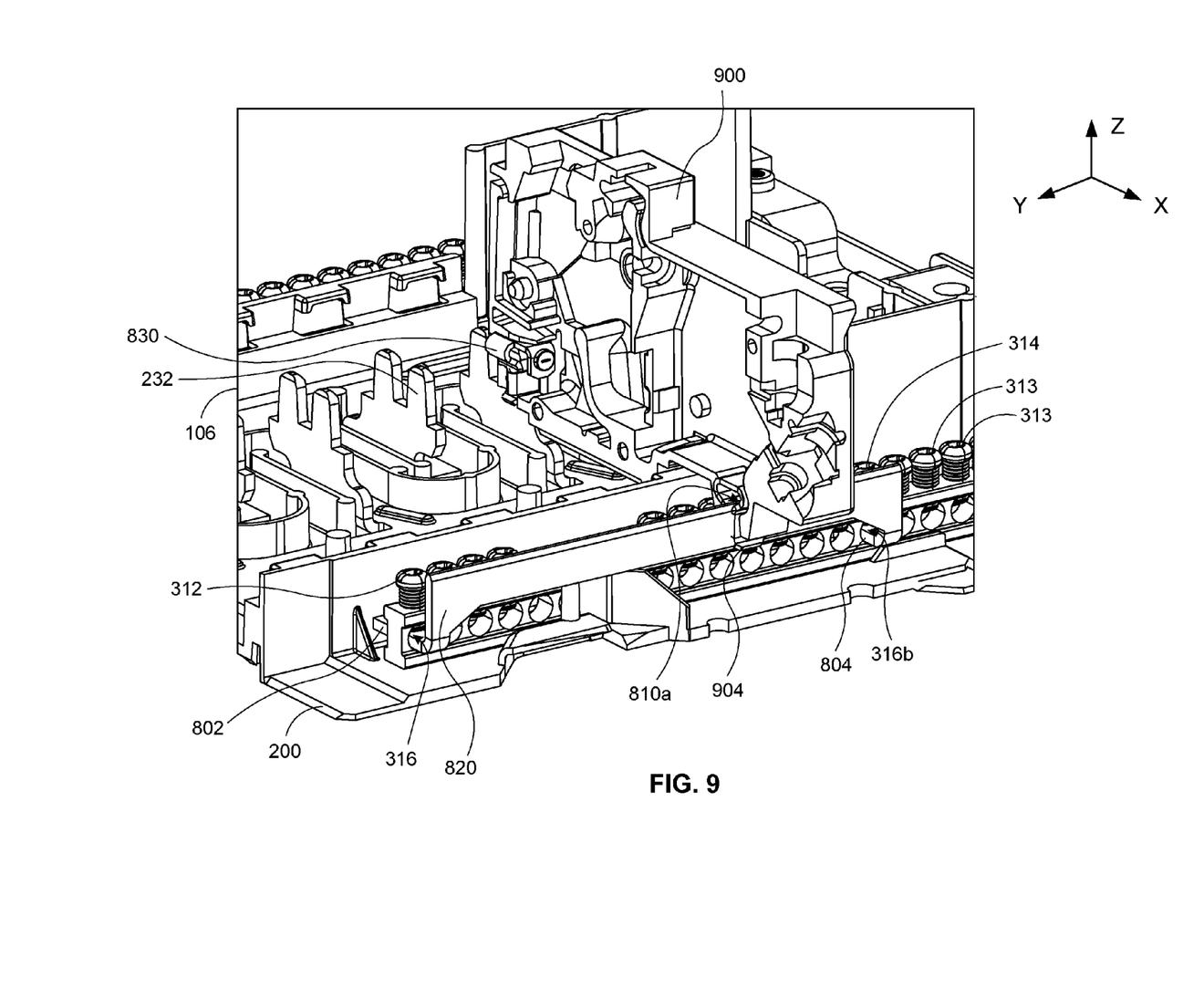
FIG. 9 is a perspective view of the load center shown in FIG. 8 with part of a circuit breaker and its corresponding downwards facing PON mounting clip clipped onto the adapter bracket shown in FIG. 8, forming a revolute joint between the case and neutral clip, which allows for rotational motion without permanent deformation of the neutral clip.

In FIG. 8, an adapter bracket 820 is shown having a support portion 806 that extends along the Z-axis direction and a first leg 802 and a second leg 804. The support portion 806 in this example has a flat, elongated shape, and includes a chamfered end 822 farthest away from the base 200. The support portion 806 includes neutral connection sites 810 (only some sites are referenced in FIG. 8 for ease of illustration), such as twelve or fifteen, regularly spaced along the length of the adapter bracket 820, onto which PON mounting clips, such as the mounting clip 904, are plugged. Note, for ease of illustration, the circuit breaker housing or casing has been removed in FIG. 8 to show the line jaw 830 plugged onto the stab 232 and the PON mounting clip 904 plugged onto a neutral connection site 810a of the adapter bracket 820. FIG. 9 shows part of a PON circuit breaker 900. The neutral bar 112 has pigtail receiving holes 316 as described into which a pigtail conductor, such as the pigtail conductor 400 shown in FIG. 4, is inserted and secured to the neutral bar 112 by one of the wire binding screws 313 inserted through a fastener-receiving hole 315 (best seen in FIG. 4). Two of the holes 316a, 316b in the neutral bar 112 are leg-receiving holes, through which a corresponding leg 802, 804 of the adapter bracket 820 is received and secured to the neutral bar 112 by a fastener such as a wire binding screw 312. Like the other adapter brackets 120, 320, the adapter bracket 820, once installed onto the neutral bar 112, does not obstruct or block the pigtail receiving holes 316, thereby allowing a pigtail conductor 400 of a circuit breaker to be connected from the circuit breaker to the neutral bar 112. Additional mounting legs 802 can be used as the number of branch circuit breakers increases requiring a longer adapter bracket 310 and 810 for larger capacity loadcenters.

In FIG. 9, half of the PON circuit breaker 900 having the PON mounting clip 904 that is plugged onto one of the neutral connection sites 810a of the support portion 806 of the adapter bracket 820. A second wire binding screw 314 can be seen in this view, which secures the second leg 804 of the adapter bracket 820, which is inserted through the leg-receiving hole 316b, to the neutral bar 112. The first wire binding screw 312 secures the first leg 802, which is inserted through the leg-receiving hole 316a, to the neutral bar 112. These two connections, in this example, are all that are needed to secure the adapter bracket 820 to the neutral bar 112, without requiring any additional fasteners or any modification to the neutral bar 112. In the example shown in FIGS. 8-9, the adapter bracket 820 has an overall length (along the Y-axis) that is shorter than an overall Y-axis length of the neutral bar 112, which allows one section of the load center 106, such as the lower section 110, to provide a plug-on neutral capability, whereas the upper section 108 can provide a "legacy" pigtail neutral connection capability. The adapter bracket according to the aspects described herein advantageously allows an existing load center 106 to be upgraded or retrofitted to accept PON-type circuit breakers.

Figure 10:
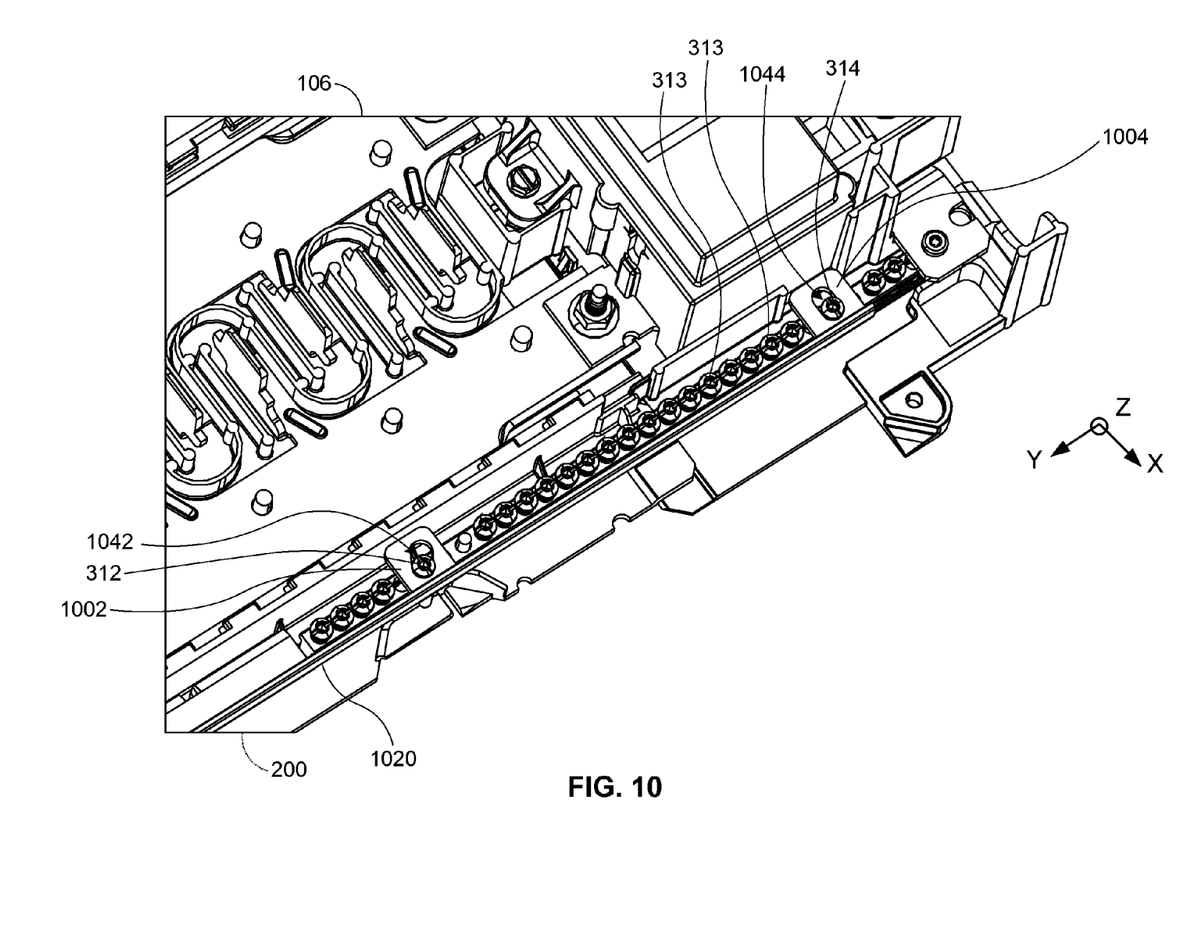
FIG. 10 is a top view of part of a load center having a plug-on neutral adapter bracket that also accepts a downwards facing PON mounting clip but uses tabs with slots that are attached to the neutral rail with corresponding wire binding screws according to yet another aspect of the present disclosure.
Figure 11:
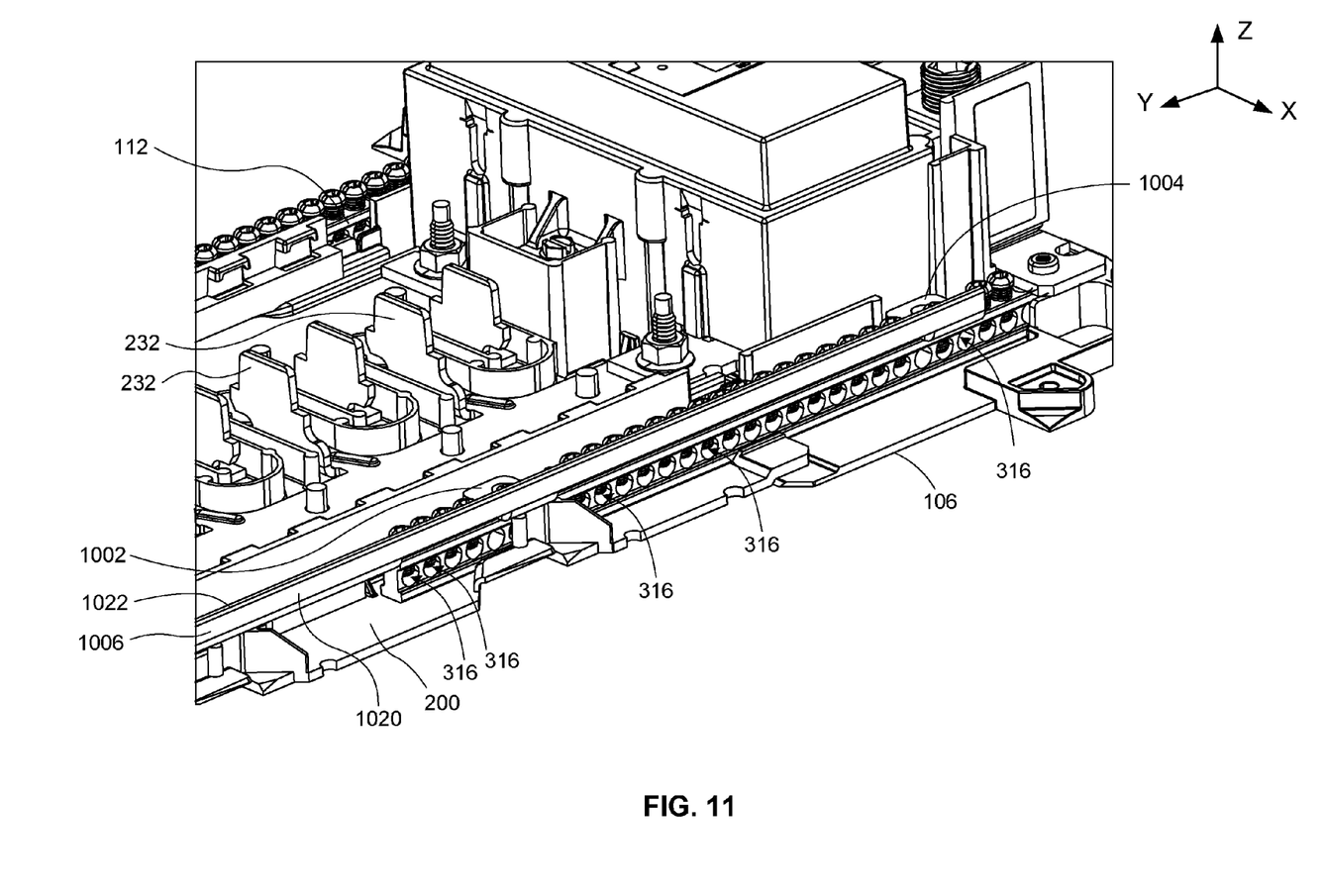
FIG. 11 is a perspective view of the neutral adapter bracket shown in FIG. 10 revealing how the pigtail connection holes in the neutral bar are not obstructed or blocked when the adapter bracket is properly installed on the neutral bar.

FIGS. 10 and 11 illustrate another example of an adapter bracket 1020 with a different attachment system to the neutral bar 112. The adapter bracket 1020 is the same bracket 120 shown in FIGS. 1 and 2, but the adapter bracket 120 shown in FIGS. 1 and 2 is generic to all of the aspects disclosed herein, as FIGS. 1 and 2 are intended to show an environmental implementation of an adapter bracket. In FIG. 10, a top (looking down along the Z-axis) view of part of a load center 106 is shown, where the load center 106 includes an adapter bracket 1020 having a first tab 1002 and a second tab 1004, each having a respective slot 1042, 1044. A first wire binding screw 312 is inserted through the first slot 1042 to secure the first tab 1002 to the neutral bar 112. A second wire binding screw 312 is inserted through the second slot 1044 to secure the second tab 1004 to the neutral bar 112. Unlike the adapters 320, 820 shown above, this adapter bracket 1020 lacks legs that are inserted through two pigtail-receiving holes 316a,b of the neutral bar 112. Instead, the tabs 1002, 1004 rest on top of the neutral bar 112 and are secured thereto by corresponding wire binding screws 312, 314. The first and second slots 1042, 1044 are dimensioned to provide two degrees of freedom of movement of the adapter bracket 1020 relative to the neutral bar 112 along the X-Y plane (coincident with the rear wall 104 of the enclosure 102). For example, as shown in the slot 1042, the shape of the slot can be configured to be diagonal to a length of the neutral bar 112 to allow adjustments to a position of the adapter bracket 1020 relative to the neutral bar 112 along the X-axis or along the Y-axis or both. Alternately, such as shown in the slot 1044, the slot can be sized to be larger than the body of the wire binding screw 314 (but not its head), to allow adjustments to the position of the adapter bracket 1020 relative to the neutral bar along the X-axis or along the Y-axis or both.

FIG. 11 shows how none of the pigtail receiving holes 316 of the neutral bar 112 is blocked or obstructed by the adapter bracket 1020 once properly installed onto the neutral bar 112. This allows for a pigtail conductor to be connected anywhere along the neutral bar 112, allowing the installer maximum flexibility as to where to mount circuit breakers with pigtail conductors and PON-type circuit breakers in the load center 106. In the example shown in FIGS. 10-11, the Y-axis length of the adapter bracket 1020 is much longer, such as twice as long, as the Y-axis length of the neutral bar 112. Thus, where there is no neutral bar 112, a "plug-on neutral only" section of the load center 106 is present, in which only PON-type circuit breakers with PON mounting clips can be installed. For ease of illustration, the same "downwards" facing mounting clip 904 shown in FIGS. 8-9 is not shown in FIGS. 10-11 but can be used to plug onto the adapter bracket 1020 shown in FIGS. 10-11.

For example, the total length of the neutral bar 112 plus any of the adapter brackets 120, 320, 820, 1010 shown and described herein can have a length of 9.5 inches to accommodate up to 12 neutral plug-on type circuit breakers or 23 inches to accommodate up to 15 neutral plug-on type circuit breakers.

FIG. 12 illustrates an example of a plug-on neutral bar 1200 having neutral bar portion 1212 and an integrated neutral adapter portion 1220, both of which form as a single, unitary piece. The neutral bar portion 1212 has the same form as the neutral bar 112 described herein. The neutral adapter portion 1220 includes a support portion 1206 that extends along the Z-axis direction and transitions into a neutral connection member 1240 that has multiple neutral connection sites 1210. The neutral connection member 1240 lies along the X-Y plane parallel to the rear wall 104, and is orthogonal to the support portion 1206 in the illustrated example. A "sideways" mounting clip 604 of a circuit breaker 600 is plugged onto one of the neutral connection sites 1210 as described above. The distance between the neutral bar portion 1212 and the neutral connection member 1240 (and thus the height of the support portion 1206 along the Z-axis) is dimensioned to provide a desired air gap spacing between the mounting clip 604 when installed onto one of the neutral connection sites 1210 and the grounded rear wall 104.

The base 200 can operates to maintain a through-air gap spacing, such as 0.5 inches, between the adapter bracket 120, 320, 820, 1010 and the grounded rear wall 104 of the enclosure 102. This ensures that the neutral connectors 604, 904 of the circuit breakers 600, 900 installed on the adapter bracket 120, 320, 820, 1020 when energized do not produce an arc or ground fault relative to the grounded rear wall 104. The phase conductors are dielectrically isolated underneath the base 200, creating a dielectric separation relative to both the grounded enclosure 100 and the energized phase conductors and the neutral bar 112 and adapter bracket 120, 320, 820, 1020.

While particular embodiments and applications of the present disclosure have been illustrated and described, it is to be understood that the disclosure is not limited to the precise construction and compositions disclosed herein and that various modifications, changes, and variations can be apparent from the foregoing descriptions without departing from the spirit and scope of the invention as defined in the appended claims.

What is claimed is:

1. A unitary adapter bracket that attaches to a neutral bar of an electrical distribution apparatus, comprising:
    a plurality of legs positioned parallel to a plane corresponding to a major flat surface of the electrical distribution apparatus having the neutral bar, wherein the neutral bar has a plurality of holes, and wherein each of the plurality of legs is inserted through a corresponding one of the holes;
    a support portion extending along a Z-axis that is perpendicular to the plane;
    a plurality of neutral connection sites each located a distance above the neutral bar along the Z-axis when the adapter bracket is secured thereto by a plurality of fasteners, each of the neutral connection sites being configured to receive a corresponding plug-on neutral mounting clip of a plug-on neutral circuit breaker.

2. The adapter bracket of claim 1, wherein the plurality of holes of the neutral bar are for receiving therein a neutral pigtail conductor of a circuit breaker, and wherein each of the plurality of legs is inserted through a corresponding one of the holes such that others of the holes remain unobstructed when the adapter bracket is attached to the neutral bar for receiving in those of the unobstructed holes the neutral pigtail conductor.

3. The adapter bracket of claim 2, wherein each of the plurality of neutral connection sites is a tab extending parallel to the plane, each of the tabs having a chamfered end.

4. The adapter bracket of claim 2, wherein the support portion is generally orthogonal to the plane such that the holes of the neutral bar run through the neutral bar parallel with the plane.

5. The adapter bracket of claim 1, wherein an aspect ratio between an overall width of each of the connection sites and an overall length of the neutral mounting clip does not exceed 1:4.

6. The adapter bracket of claim 1, wherein the plurality of holes of the neutral bar are for receiving therein a neutral pigtail conductor of a circuit breaker, and wherein each of the plurality of legs is inserted through a corresponding one of the holes such that the adapter bracket does not block any of the holes except for those that receive corresponding ones of the plurality of legs.

7. The adapter bracket of claim 1, wherein the bracket is attached to the neutral bar by a plurality of wire binding screws each of which secures a corresponding one of the legs to the neutral bar, the wire binding screws being received in corresponding ones of a plurality of fastener-receiving holes that extend along the Z-axis through the neutral bar.

8. The adapter bracket of claim 1, wherein a length of the adapter bracket is shorter than a length of the neutral bar.

9. The adapter bracket of claim 1, wherein the plurality of neutral connection sites are located along the support portion such that the plug-on neutral mounting clip of the plug-on neutral circuit breaker plugs onto a corresponding one of the neutral connection sites along the Z-axis direction.

10. The adapter of claim 9, wherein the neutral bar has a plurality of holes for receiving therein a neutral pigtail conductor of a circuit breaker, and wherein the support portion is generally orthogonal to the plane such that the holes of the neutral bar run through the neutral bar parallel with the plane.

11. The adapter bracket of claim 1, wherein the neutral bar includes a plurality of fastener-receiving holes that extend along the Z-axis through the neutral bar and each of the plurality of neutral connection sites is a tab extending parallel to the plane, each of the tabs having a slot for receiving therethrough a wire binding screw that is also received in a corresponding one of the fastener receiving holes to thereby secure the unitary adapter to the neutral bar.

12. The adapter bracket of claim 11, wherein the slot is dimensioned to provide two degrees of freedom of movement of the adapter bracket relative to the neutral bar along the plane.

13. An electrical distribution apparatus, comprising:
    a housing having a rear wall corresponding to a plane that lies orthogonal to a Z-axis;
    a neutral bar positioned in the housing in a fixed relationship thereto, the neutral bar having a plurality of holes running therethrough parallel with the plane and a plurality of fastener-receiving holes extending along the Z-axis through the neutral bar and coinciding with corresponding ones of the plurality of holes inside the neutral bar; and an adapter bracket, including:

a plurality of legs configured to be received through corresponding ones of the plurality of holes of the neutral bar, a support portion extending along the Z-axis and having an exposed end that includes a plurality of neutral connection sites each located a distance above the neutral bar along the Z-axis when the adapter bracket is mechanically secured and electrically coupled to the neutral bar, each of the neutral connection sites being configured to receive thereon a corresponding plug-on neutral mounting clip of a plug-on neutral circuit breaker installed into the electrical distribution apparatus.

14. The apparatus of claim 13, wherein each of the neutral connection sites is a tab extending parallel to the plane such that the plug-on neutral mounting clip is plugged onto the adapter bracket along a direction that includes a direction parallel to the plane, and wherein each of the legs is configured to be inserted through a corresponding one of the holes such that the adapter bracket does not block any of the holes except for those that receive corresponding ones of the plurality of legs, and wherein the adapter bracket is attached to the neutral bar by a plurality of fasteners each of which secures a corresponding one of the legs to the neutral bar through the corresponding one of the holes, and wherein those of the holes that do not receive one of the legs therethrough are configured to receive therein a neutral pigtail conductor of a circuit breaker installed into the electrical distribution apparatus.

15. The apparatus of claim 13, wherein the adapter bracket when mechanically attached to the neutral bar is configured to conduct neutral current from the circuit breakers electrically coupled to the neutral bar in the electrical distribution apparatus to the neutral bar through the legs, and wherein the plurality of neutral connection sites are located along the support portion and correspondingly along the Z-axis such that the plug-on neutral mounting clip of the plug-on neutral circuit breaker plugs onto a corresponding one of the neutral connection sites along a direction that follows the Z-axis direction.

* * * * *